March 24, 1970 W. J. LAWSON 3,502,128
METHOD AND APPARATUS FOR PEELING FRUITS OR VEGETABLES
Filed June 6, 1967

*INVENTOR*
WILLIAM J. LAWSON

BY Plumley, Tryner & Sandt
ATTORNEYS

United States Patent Office 3,502,128
Patented Mar. 24, 1970

3,502,128
METHOD AND APPARATUS FOR PEELING
FRUITS OR VEGETABLES
William J. Lawson, R.F.D. 1, Box 299E,
Milton, Del. 19968
Filed June 6, 1967, Ser. No. 643,961
Int. Cl. A23n 7/00
U.S. Cl. 146—231                                    2 Claims

ABSTRACT OF THE DISCLOSURE

Method and apparatus for peeling thin-skinned fruits or vegetables by passing the fruit or vegetable through a fluidized bed of hot granules for a time sufficient to condition the skin for removal without causing the temperature of the body of the fruit or vegetable to be raised substantially.

DISCLOSURE OF THE INVENTION

This invention relates to a method for peeling fruits or vegetables having a thin skin and to an apparatus for accomplishing this method.

Methods and apparatus for peeling fruits or vegetables have, in the past, relied upon some means for scraping or cutting the skin from the fruit or vegetable, or, alternatively, for applying a strong solution, such as lye, to remove that skin. Such methods are not desirable for many reasons. The cutting and abrading type of peeler frequently bruises the food and removes an excessive amount of the meat of the fruit or vegetable along with the skin. The chemical peeling method partially cooks the raw fruit or vegetable by employing a hot, toxic material which could be dangerous to humans if it were not completely removed from the peeled product, and, in any case, is a potential contaminant which must be neutralized. Furthermore, much of the valuable food is lost by this method. In both of these prior art processes the skin is a by-product which is waste and must be disposed of in some fashion, which may be expensive or be a pollution to the atmosphere or to other natural resources. The present invention provides a method and an apparatus which overcomes these prior difficulties and produces a peeled product with substantially no loss of the edible part of the food and with a minimum amount of waste skin which may be disposed of by any of a variety of acceptable methods.

It is an object of this invention to provide a novel method for blistering the skin of thin-skinned fruits or vegetables for easy removal of the skin by subsequent brushing or its equivalent.

It is another object of this invention to provide a novel method for peeling thin-skinned fruits or vegetables.

It is another object of this invention to provide a novel method for peeling fruits or vegetables with a minimum loss of the edible portions of the food and with all disposable waste in the form of an ash.

It is still another object of this invention to provide an apparatus for accomplishing the foregoing objects.

Still other objects will be apparent from the more detailed description of this invention which follows.

This invention provides a method for causing the skins of thin-skinned fruits or vegetables to blister by passing the fruit or vegetable through a fluidized bed of hot granules for a period of time which is not sufficient to cause the temperature of the body of the fruit or vegetable to be raised substantially above normal. The blistered product is rubbed, brushed, or the like to remove the skin and leave the peeled product. In preferred embodiments of this invention the method employs hot granules comprising a siliceous material at a temperature of 700° F.–1400° F.

This invention also provides an apparatus for peeling thin-skinned fruits or vegetables. The apparatus comprises a housing which is divided into an upper and a lower chamber by a diffusion plate which contains a multiplicity of substantially uniformly spaced, upwardly directed gas flow orifices, and supported on that plate a bed of fluidizable granules of a size larger than the size of the orifices in the diffusion plate. A rotating shaft is positioned above the fluidized bed and carries a series of parallel fingers attached to that shaft which are interleaved with a similar series of spaced, parallel, curved ribs attached to the housing in the upper chamber, the spacing between adjacent ribs and between adjacent fingers being less than the size of the fruit or vegetable which is to be peeled. A means is provided for introducing a hot gas under pressure below the diffusion plate; a means is provided for conducting the spent gas away from the upper chamber; a means is provided for introducing the material to be treated into the machine; and a means is provided for removing the blistered product from the machine for easy removal of the blistered skin.

This invention and its operation may be more readily understood by reference to the attached drawings.

Figure 1:
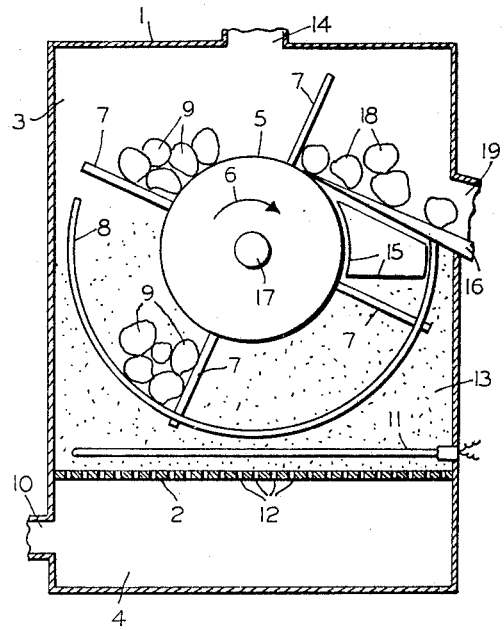
FIGURE 1 is an end elevational view in cross-section of the apparatus of this invention.
Figure 2:
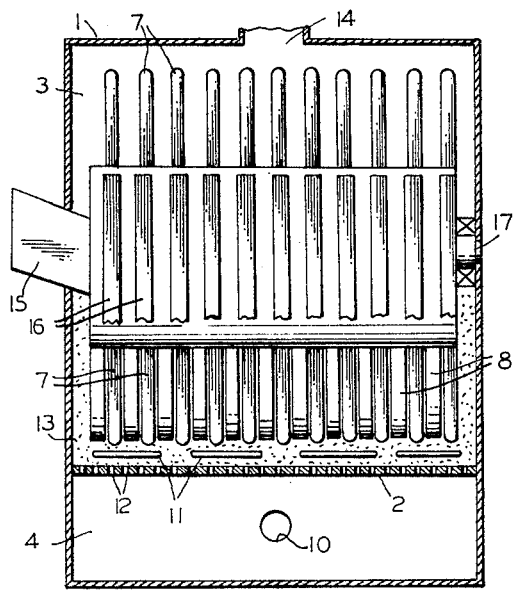
FIGURE 2 is a side elevational view in cross-section of the apparatus of this invention.

By specific reference to FIGURES 1 and 2 a housing 1 is schematically represented as containing a diffusion plate 2 which divides the internal space of housing 1 into an upper chamber 3 and a lower chamber 4. In upper chamber 3 there is mounted a rotating shaft 5 which rotates in the direction shown by arrow 6, and is journaled into housing 1 by a suitable bearing and shaft combination 17. Fixedly attached to rotating shaft 5 are one or more series of parallel fingers 7 which are interleaved between a similar series of spaced, parallel, arcuate ribs 8 fixedly attached to housing 1 by means not shown. Four series of fingers 7 are shown in FIGURE 1 which is the preferred embodiment of this invention. Fingers 7 and ribs 8 are of such sizes and are spaced at such distances that each finger 7 passes between adjacent ribs 8 without touching ribs 8. Furthermore, the spacing is such that the thin-skinned fruit or vegetable 9 which is being peeled will not pass between adjacent fingers 7 or between adjacent ribs 8.

Into a lower chamber 4 there is introduced by means of a suitable conduit 10 a supply of a pressurized gas, preferably air, at or near the operating temperature. The heated, pressurized gas passes through a multiplicity of spaced orifices 12 in diffusion plate 2 to fluidize a bed of granules 13 and is eventually removed through outlet 14. One or more heating elements 11 are positioned immediately above plate 2 to maintain the pressurized gas and granules 13 at the desired operating temperature. The relative positions of shaft 5 and plate 2 along with the appropriate amounts of granules 13 and pressurized gas should be such that the top of the fluidized bed reaches approximately the horizontal centerline of shaft 5. The fruit or vegetable 9 is pushed through the fluidized bed of granules 13 by fingers 7, and while passing through the bed, the hot granules cause the skin of the fruit or vegetable 9 to be blistered, so that it can be rubbed off, in any convenient manner, e.g. by cooperating rotary brushes or their equivalent.

The unpeeled fruit or vegetable is introduced through feed port 15 to the space above ribs 8. The peeled product is removed from fingers 7 by a series of fixed parallel bars 16 which are spaced substantially the same as ribs 8 so that fingers 7 will interleave therewith. Preferably bars 16 are inclined downwardly to permit the peeled product to be removed by gravity. The blistered product at 18 will be caught by bars 16 and removed from the apparatus through exit port 19.

Figure 3:
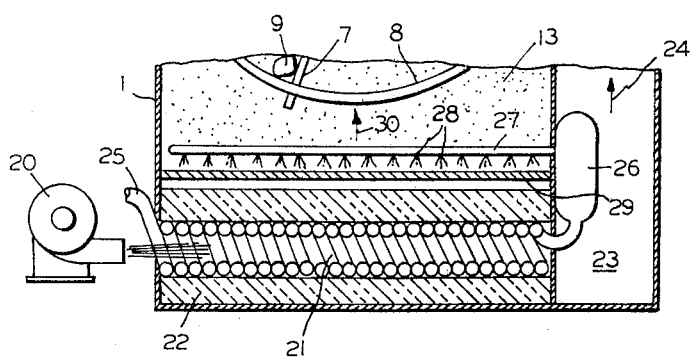
FIGURE 3 is a partial end elevational view in cross-section of an alternate embodiment of the apparatus of this invention.

In FIGURE 3 there is shown an alternative means for heating the gas which is employed to fluidize the bed of granules. In this instance a heater 20, which may be oil fired, gas fired, or the like, directs its flame to the interior of a coil 21 encased in a suitable insulation material 22 with the waste gas exiting out the other end of coil 21 into flue 23 and thence out a suitable stack in the direction of arrow 24. A gas is introduced under pressure preferably into coil 21 at entrance 25 and exits the other end of the coil into a header 26 to which is connected a series of tubes 27 having orifices 28 directed downwardly against a solid diffusion plate 29 which causes the exiting air to spray out in all directions while changing course so as to flow upwardly in the direction of arrow 30 to fluidize the bed of granules. The remainder of the apparatus is exactly the same as that shown in FIGURE 1.

Figure 4:
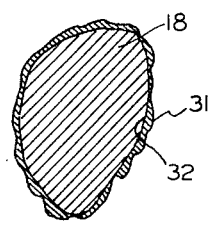
FIGURE 4 is a cross-sectional view of a fruit or vegetable with its skin blistered by the method of this invention.

In FIGURE 4 there is a schematic view of the cross-section of a blistered product, such as that removed at 18 in FIGURE 1. The skin 31 separates in a series of blisters from the body 32 of the fruit or vegetable 18. This effect which is substantially uniform over the entire skin is probably caused by vaporization of the moisture immediately under the skin of the raw product causing the skin 31 to explode or be pushed away from the body 32 and yet not be completely detached therefrom. It is apparent therefore that the blistered skin can then be easily detached from the body by brushing, washing, rubbing or the like.

In the operation of this device fruits or vegetables, for example, potatoes are introduced through feed port 15 to the space (roughly in the shape of a quarter of a cylinder) between adjacent series of fingers 7. A series of fingers 7 pushes the potatoes through the fluidized bed in the direction indicated by arrow 6 at such a rate of travel that there will be sufficient time for the particles of material in the fluidized bed 13 to contact the skin and cause it to blister, but not for a time long enough to raise the temperature of the body of the potatoes 9 sufficiently to cause them to be cooked or otherwise produce any damage. By this time the fingers 7 have pushed the potatoes out of the fluidized bed and around the top of the apparatus until contacted by bars 16 which effectively remove the blistered potatoes and permit them to be recovered through outlet port 19. Any portions of blistered skin which detach themselves completely from the body will be burned to an ash by continued action of hot granules 13 and removed through outlet 14.

The fluidized particles are preferably siliceous, such as sand, quartz, ceramic materials, and the like; although it is not intended to limit the particles to a siliceous composition since they may be any of a variety of materials which will withstand the temperature of the operation without modifying the physical properties of the material and without causing any undesirable effects on the fruit or vegetable being peeled. Metallic particles, salt, pumice, crushed stone, or other non-toxic materials may be employed for this purpose. It is not necessary that the particles have sharp edges since they do not perform an abrasive action, and therefore smooth or jagged granules are equally operable. The size of the granules will vary depending on their density but may be generally in the range of about 150–200 mesh.

The temperature of the particles should be in the range of 700° F.–1400° F., preferably 700° F.–900° F., and this may be accomplished by heating the gas to a suitable temperature before or after it is introduced into lower chamber 4 of the apparatus. Preferably the final heat is applied to the gas by means of electrical element 11 so as to reduce atmospheric pollution. Normally the gas which is employed is air at a selected, controlled pressure of approximately 2–5 pounds per square inch gauge and in sufficient volume to maintain the fluidized bed high enough to reach the horizontal centerline of rotating shaft 5. In the preferred embodiment of this invention orifices 12 have a diameter of approximately 1/64 of an inch and are evenly spaced over the entire area of plate 2 on 3/4 to 1 inch centers. These variables may be combined into a space velocity which preferably ranges from about 3 to 4 cu. ft. air at 5 p.s.i.g. per minute per sq. ft. of area of plate 2.

The skin of the fruit or vegetable as it passes through the fluidized bed is heated quickly by contact with the hot granules, causing the moisture underneath the skin to vaporize and to explode, rupturing the skin, and making it easy to remove by brushing, washing, or rubbing. Normally, the force of water from a nozzle will be sufficient to remove the blistered skin. In general, this can be described as a blistered effect although in some instances the skin may be removed completely or, alternatively, remain attached to the body in the form of a shrunken, dry patch. All of such described variations or their equivalents are intended to be included with the term "blistered." The blistered effect is achieved by the proper coordination of contact time and temperature between the skin of the fruit or vegetable and the fluidized bed particles. Suitable controls over the temperature of the pressurized gas and the rotational speed of shaft 5 permits the method and apparatus of this invention to be adjusted to fit any fruit or vegetable being peeled.

EXAMPLE

Old potatoes and onions were subjected to various contact times and temperatures in an apparatus substantially the same as that shown in FIGURES 1 and 2 of the attached drawings employing silica particles as the granules in the fluidized bed. The results are shown in the following tabulation in which "Temperature" is the temperature in ° F. of the air and granules in the fluidized bed, "Time" is the elapsed time in seconds during which the potato or onion is subjected to the fluidized bed and "Penetration" is the depth in inches of damaged portions underneath the skin. The product skins were blistered and easy to remove in each instance by brushing or rubbing lightly. The body of the potato or onion was firm, uncooked, and not discolored.

| Product | Temperature, ° F. | Time, sec. | Penetration, inches |
|---|---|---|---|
| Potatoes | 700 | 30 | 3/16 |
| Do | 800 | 25 | 1/8 |
| Do | 820 | 20 | <1/8 |
| Do | 840 | 18 | 1/16 |
| Do | 850 | 16 | None |
| Do | 850 | 60 | 1/4 |
| Do | 900 | 20 | None |
| Do | 970 | 15 | None |
| Onions | 700 | 7 | None |
| Do | 800 | 5 | None |
| Do | 820 | 4.5 | None |
| Do | 840 | 4 | None |
| Onions (second layer) [1] | 850 | 10 | None |

[1] In this instance the second layer of skin was blistered for removal, in all other instances only the outer layer of skin was blistered.

Although the invention has been described in considerable detail with reference to certain preferred embodiments thereof, it will be understood that variations and modifications can be effected within the spirit and scope of the invention that is described hereinabove and as defined in the appended claims.

What is claimed is:

1. An apparatus for blistering the skins of fruits or vegetables which comprises a housing divided into upper and lower chambers by a diffusion plate containing a multiplicity of substantially uniformly spaced, upwardly directed, gas flow orifices, a bed of fluidizable granules immediately above said diffusion plate, a series of parallel fingers fixedly attached to a rotatable shaft and interleaved with a series of spaced, parallel, arcuate ribs fixedly attached to said housing in said upper chamber, the spacing between adjacent ribs and between adjacent fingers being less than the size of the fruit or vegetable being peeled, means for introducing a hot, pressurized gas into said lower chamber in sufficient amounts to fluidize said bed of granules, a passageway for conducting spent gas away from said upper chamber, a means for introducing a thin-skinned fruit or vegetable to the upper side of said ribs, means for removing the blistered product, and means for rotating said shaft.

2. The apparatus of claim 1 used in combination with a brushing means which receives the blistered product and brushes away the blistered skin to produce a peeled fruit or vegetable.

References Cited

UNITED STATES PATENTS

| | | | |
|---|---|---|---|
| 719,617 | 2/1903 | Scovill | 146—46 |
| 2,557,555 | 6/1951 | Miner | 146—231 X |

W. GRAYDON ABERCROMBIE, Primary Examiner

U.S. Cl. X.R.

146—229, 241